(12) United States Patent
Kim et al.

(10) Patent No.: US 9,729,098 B2
(45) Date of Patent: Aug. 8, 2017

(54) SYSTEM FOR CONTROLLING MOTOR OF HYBRID ELECTRIC VEHICLE

(71) Applicant: Hyundai Motor Company, Seoul (KR)

(72) Inventors: Sung Kyu Kim, Gyeonggi-do (KR); Mu Shin Kwak, Gyeonggi-do (KR); Hong Geuk Park, Chungcheongnam-do (KR); Suhyun Bae, Daegu (KR)

(73) Assignee: Hyundai Motor Company, Seoul (KR)

( * ) Notice: Subject to any disclaimer, the term of this patent is extended or adjusted under 35 U.S.C. 154(b) by 395 days.

(21) Appl. No.: 14/515,082

(22) Filed: Oct. 15, 2014

(65) Prior Publication Data

US 2015/0145445 A1    May 28, 2015

(30) Foreign Application Priority Data

Nov. 27, 2013 (KR) .................. 10-2013-0145537

(51) Int. Cl.
    *H02P 21/00*      (2016.01)
    *H02P 21/22*      (2016.01)
    *H02P 29/68*      (2016.01)

(52) U.S. Cl.
    CPC .............. *H02P 21/22* (2016.02); *H02P 29/68* (2016.02)

(58) Field of Classification Search
    CPC ......... H02P 6/182; H04R 29/003; H04R 3/08; B25C 1/06; B62D 5/046
    See application file for complete search history.

(56) References Cited

U.S. PATENT DOCUMENTS

| 4,977,507 | A | * | 12/1990 | Matsuoka | B62D 5/0487 180/404 |
|---|---|---|---|---|---|
| 8,547,045 | B2 | * | 10/2013 | Wu | H02P 7/285 318/400.02 |
| 2014/0306637 | A1 | * | 10/2014 | Wu | H02P 27/08 318/504 |
| 2014/0354204 | A1 | * | 12/2014 | Tachibana | H02P 6/08 318/473 |
| 2015/0145445 | A1 | * | 5/2015 | Kim | H02P 29/68 318/400.02 |

FOREIGN PATENT DOCUMENTS

| KR | 10-0313251 | | 10/2001 |
|---|---|---|---|
| KR | 10-0561733 | | 3/2006 |
| KR | 10-2012-0061670 | | 6/2012 |
| WO | WO-2013108877 | * | 7/2013 |

* cited by examiner

*Primary Examiner* — Shawki S Ismail
*Assistant Examiner* — Zoheb Imtiaz
(74) *Attorney, Agent, or Firm* — Mintz Levin Cohn Ferris Glovsky and Popeo, P.C.; Peter F. Corless

(57) ABSTRACT

A system for controlling a motor of a hybrid vehicle determines a current of a first axis and a current of a second axis according to a driving condition, converts the currents of the first and second axes into a 3-phase AC current, and drives the motor by applying the 3-phase AC current to the motor, and includes: a revised temperature calculation module that calculates a revised temperature in order to compensate a torque error according to counter electromotive force dispersion of the motor; and a current determination module that determines the currents of the first and second axes by substituting the corrected temperature to a current map for each temperature and by using a demand torque at a present driving condition, a present speed of the motor, and a maximum counter magnetic flux of the motor.

3 Claims, 3 Drawing Sheets

SYSTEM FOR CONTROLLING MOTOR OF HYBRID ELECTRIC VEHICLE

CROSS-REFERENCE TO RELATED APPLICATION

This application claims under 35 U.S.C. §119(a) priority to and the benefit of Korean Patent Application No. 10-2013-0145537 filed in the Korean Intellectual Property Office on Nov. 27, 2013, the entire contents of which are incorporated herein by reference.

BACKGROUND (a) Field of the Invention

The present invention relates to a system for controlling a motor of a hybrid electric vehicle, more particularly, to a system for controlling a motor of a hybrid electric vehicle that can secure reliability and stability of motor control by compensating a torque error according to counter electromotive force dispersion of the motor.

(b) Description of the Related Art

Recently, environmentally-friendly vehicles such as hybrid vehicles and electric vehicles attract increasing attention due to energy depletion and environmental pollution. The environmentally-friendly vehicles include a motor that generates driving torque by using electricity of a battery.

The motor which is applied to the environmentally-friendly vehicles has counter electromotive force dispersion within ±5%. The counter electromotive force dispersion causes an error of controlling a motor torque. In addition, the motor which has counter electromotive force dispersion exceeding a range of a current map for a motor cannot be controlled. The motor which has counter electromotive force dispersion exceeding a range of a current map for a motor has a big vibration of an output torque corresponding to an input current, so the motor cannot be driven normally.

Conventionally, the motor is managed according to a constant standard of counter electromotive force dispersion of the motor. If a higher standard is applied, substandard motors are generated significantly. Thus, production cost may be increased. On the other hand, if a lower standard is applied, the motor may not satisfy output torque of the motor.

The above information disclosed in this Background section is only for enhancement of understanding of the background of the invention and therefore it may contain information that does not form the prior art that is already known in this country to a person of ordinary skill in the art.

SUMMARY

The present invention discloses a system for controlling a motor of a hybrid electric vehicle having advantages of reducing production cost and securing reliability and stability of motor control by compensating a torque error according to counter electromotive force dispersion of the motor.

Embodiments of the present invention are not limited to the aforementioned objective, and other objectives not mentioned above will be apparently understood by a person of ordinary skill in the art, to which the present invention belongs, from the following description.

An exemplary embodiment of the present invention provides a system for controlling a motor of a hybrid electric vehicle that may include a current order generator determining currents of first and second axes according to a driving condition; a current controller generating voltages of the first and second axes by using the currents of the first and second axes determined by the current order generator and feedback currents of the first and second axes; a coordinate transformer converting the voltages of the first and second axes into 3-phase voltage, and converting 3-phase feedback current into the feedback currents of the first and second axes and transmitting the feedback currents of the first and second axes to the current controller; a signal generator receiving the 3-phase voltage from the coordinate transformer and generating 3-phase signal corresponding thereto; a PWM inverter generating 3-phase current based on the 3-phase signal, and transmitting the 3-phase current to the coordinate transformer as the 3-phase feedback current; and a motor driven by receiving the 3-phase current from the PWM inverter; wherein the current order generator includes a revised temperature calculation module calculating a revised temperature in order to compensate a torque error according to counter electromotive force dispersion of the motor, and a current determination module determining the currents of the first and second axes by substituting the corrected temperature to a current map for each temperature and by using a demand torque at a present driving condition, a present speed of the motor, and a maximum counter magnetic flux of the motor.

The revised temperature may be calculated based on a counter electromotive force constant value at an angle of 90 degree of the motor and a counter electromotive force design value at an angle of 90 degree of the motor.

The counter electromotive force constant value at an angle of 90 degree of the motor may be calculated based on a counter electromotive force constant value at a present temperature of the motor, a counter electromotive force temperature coefficient, and a present temperature of the motor.

The counter electromotive force constant value at a present temperature of the motor may be calculated based on a d-axis voltage of the motor, a q-axis voltage of the motor, and an electrical angular velocity.

Another exemplary embodiment of the present invention provides a system for controlling a motor of a hybrid electric vehicle that may determine a current of a first axis and a current of a second axis according to a driving condition, converts the currents of the first and second axes into a 3-phase AC current, and drives the motor by applying the 3-phase AC current to the motor. The system may include a revised temperature calculation module calculating a revised temperature in order to compensate a torque error according to counter electromotive force dispersion of the motor; and a current determination module determining the currents of the first and second axes by substituting the corrected temperature to a current map for each temperature and by using a demand torque at a present driving condition, a present speed of the motor, and a maximum counter magnetic flux of the motor.

The revised temperature calculation module may calculate the revised temperature in order to compensate a torque error according to counter electromotive force dispersion of the motor by calculating a counter electromotive force constant value at a present temperature of the motor based on a d-axis voltage of the motor, a q-axis voltage of the motor, and an electrical angular velocity, and by calculating a counter electromotive force constant value at an angle of 90 degree of the motor based on the counter electromotive force constant value at a present temperature of the motor, a counter electromotive force temperature coefficient, and a present temperature of the motor.

As described above according to an exemplary embodiment of the present invention, an output torque of the motor can be satisfied by calculating a revised temperature based on a counter electromotive force constant value at an angle of 90 degree of the motor, and by compensating a torque error based on the revised temperature. Therefore, a fuel efficiency of the hybrid electric vehicle can be improved and reliability and stability of motor control can be secured.

In addition, a standard of counter electromotive force dispersion of the motor can be relaxed, so production cost can be decreased.

DETAILED DESCRIPTION OF THE EMBODIMENTS

Figure 1:
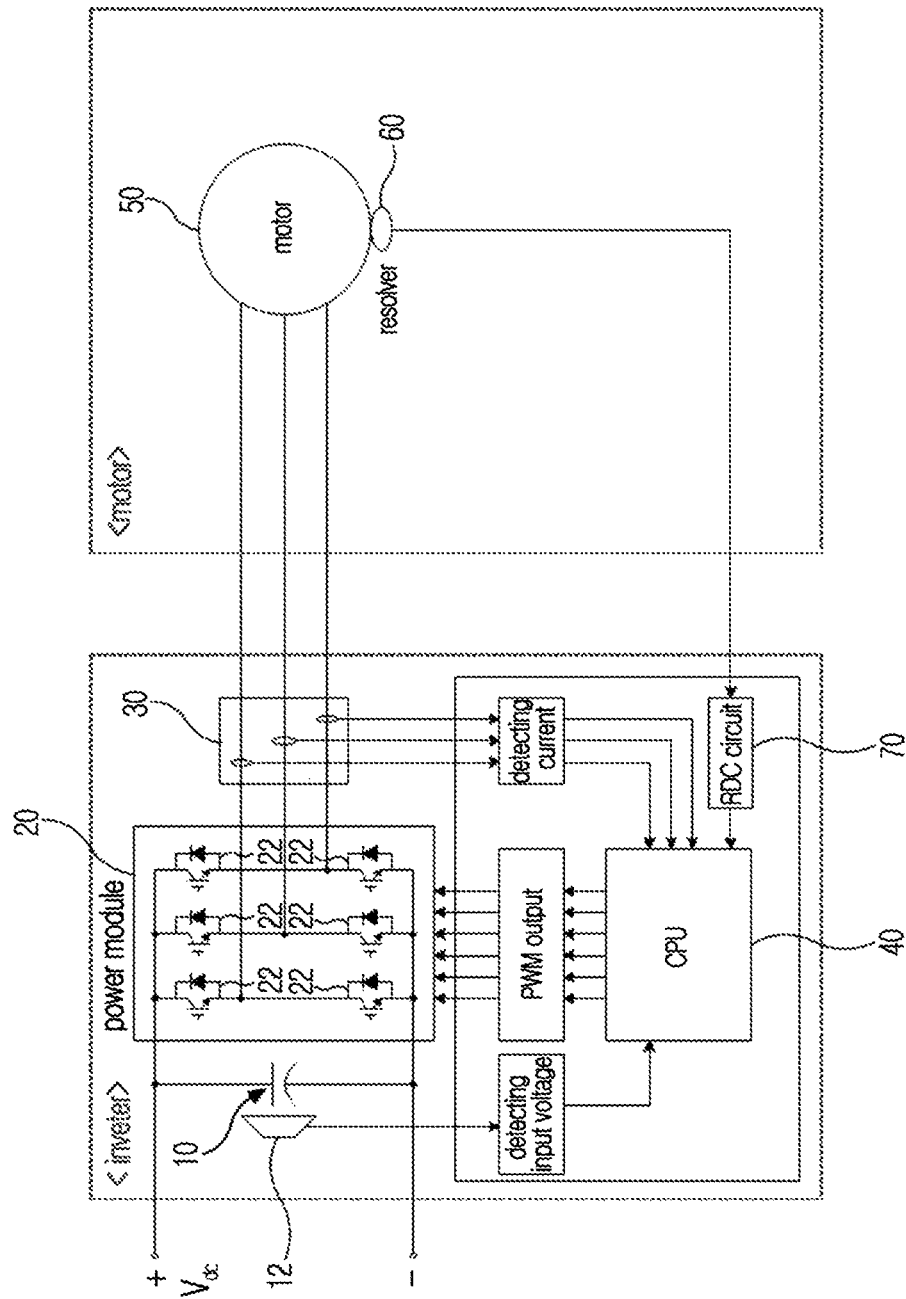
FIG. 1 is a schematic diagram of a motor system in a hybrid vehicle according to an exemplary embodiment of the present invention.

An exemplary embodiment of the present invention will hereinafter be described in detail with reference to the accompanying drawings. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

FIG. 1 is a schematic diagram of a motor system in a hybrid vehicle according to an exemplary embodiment of the present invention.

As shown in FIG. 1, a motor system of a hybrid vehicle according to an exemplary embodiment of the present invention includes an inverter module and a motor 50.

The inverter module receives a DC voltage $V_{dc}$ of a battery, determines a current according to a driving condition of a vehicle, and applies the determined current to the motor 50. For these purposes, the inverter module includes a capacitor 10, a power module 20, a CPU 40, and an RDC circuit 70.

The capacitor 10 is connected to both ends of the battery and protects the power module 20 by preventing a voltage of the battery from being directly applied to the power module 20. A voltmeter 12 detects the DC voltage $V_{dc}$ of the battery applied to the capacitor 10 and delivers a signal corresponding thereto to the CPU 40.

The power module 20 includes a plurality of switching elements 22, converts the DC voltage of the battery into a 3-phase AC current by operations of the switching elements 22, and applies the 3-phase AC current to the motor 50. An ammeter 30 detects the converted 3-phase AC current and delivers a signal corresponding thereto to the CPU 40.

The CPU 40 generates a PWM signal for controlling the switching elements 22 according to the driving condition of the vehicle and applies the PWM signal to the power module 20. The driving condition of vehicle includes a demand torque, the DC voltage of the battery, a speed of the motor 50, and a temperature of the motor 50.

The RDC circuit 70 calculates the speed of the motor 50 by receiving a signal corresponding to a phase of the motor 50 and delivers a signal corresponding to the calculated speed of the motor 50 to the CPU 40.

The motor 50 receives the 3-phase AC current from the power module 20, and thereby operates. A resolver 60 is mounted at the motor 50, detects the phase (rotating angle) of the motor 50, and delivers the detected phase of the motor 50 to the RDC circuit 70.

Figure 2:
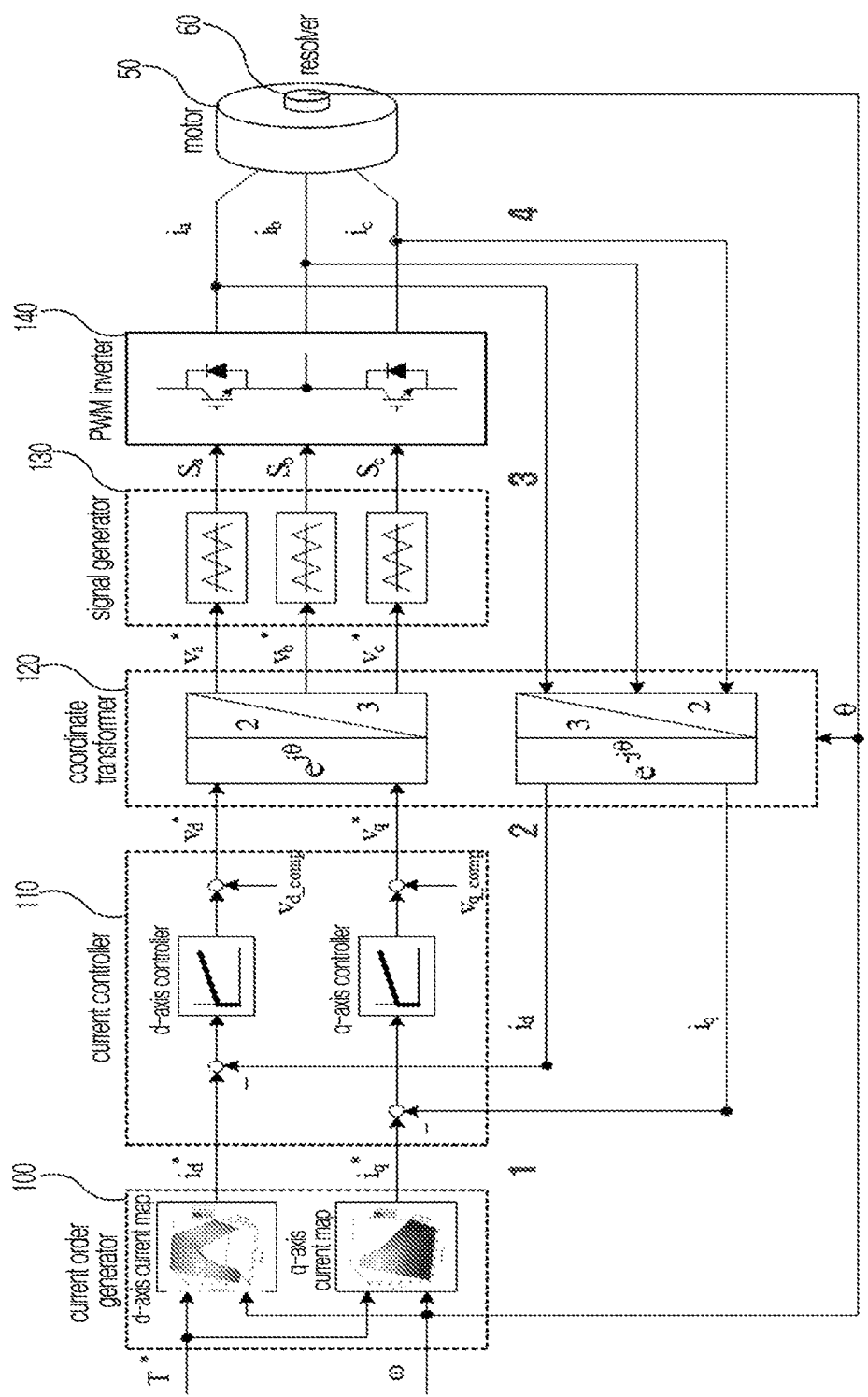
FIG. 2 is a schematic diagram of a system for controlling a motor of a hybrid vehicle according to the exemplary embodiment of the present invention.

FIG. 2 is a schematic diagram of a system for controlling a motor of a hybrid vehicle according to an exemplary embodiment of the present invention.

As shown in FIG. 2, a system for controlling a motor of a hybrid vehicle according to an exemplary embodiment of the present invention includes a current order generator 100, a current controller 110, a coordinate transformer 120, a signal generator 130, a PWM inverter 140, the motor 50, and the resolver 60.

The current order generator 100 determines a d-axis current and a q-axis current according to the driving condition of the vehicle. For this purpose, the current order generator 100 has a d-axis current map and a q-axis current map. Therefore, if a torque T* demanded at a current driving condition and a current speed ω of the motor 50 are input to the current order generator 100, the current order generator 100 calculates the d-axis current $i_d^*$ and the q-axis current $i_q^*$ corresponding to the torque and the speed of the motor.

The current controller 110 calculates a d-axis voltage $V_d^*$ and a q-axis voltage $V_q^*$ by using the d-axis current $i_d^*$ and the q-axis current $i_q^*$ delivered from the current order generator 100 and a d-axis feedback current $i_d$ and a q-axis feedback current $i_q$.

The coordinate transformer 120 receives the d-axis voltage $V_d^*$ and the q-axis voltage $V_q^*$ from the current controller 110 and converts the d-axis voltage $V_d^*$ and the q-axis voltage $V_q^*$ into 3-phase AC voltages $V_a^*$, $V_b^*$, and $V_c^*$. In addition, The coordinate transformer 120 receives 3-phase AC currents $i_a$, $i_b$, and $i_c$ applied to the motor 50 as the feedback currents and converts the 3-phase AC currents $i_a$, $i_b$, and $i_c$ into the d-axis feedback current $i_d$ and the q-axis feedback current $i_q$.

The signal generator 130 receives the 3-phase AC voltages $V_a^*$, $V_b^*$, and $V_c^*$ from the coordinate transformer 120 and converts the 3-phase AC voltages $V_a^*$, $V_b^*$, and $V_c^*$ into 3-phase switching signals $S_a$, $S_b$, and $S_c$.

The PWM inverter 140 includes a plurality of switching elements. The PWM inverter 140 receives the 3-phase switching signal $S_a$, $S_b$, and $S_c$ from the signal generator 130 and converts the 3-phase switching signal $S_a$, $S_b$, and $S_c$ into the 3-phase AC current $i_a$, $i_b$, and $i_c$.

The motor 50 is driven by receiving the 3-phase AC current $i_a$, $i_b$, and $i_c$ from the PWM inverter 140.

The resolver 60 is mounted at the motor 50, detects the phase of the motor 50, and delivers a signal corresponding thereto to the coordinate transformer 120 and the current order generator 100.

Figure 3:
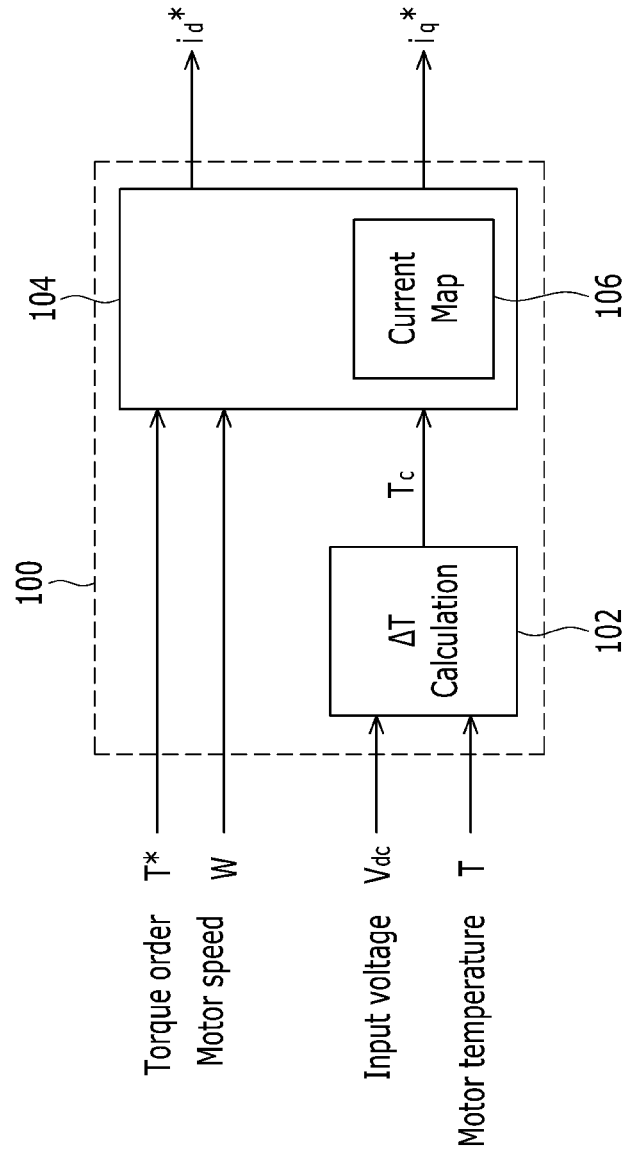
FIG. 3 is a schematic diagram of a current order generator in a system for controlling a motor of a hybrid vehicle according to the exemplary embodiment of the present invention.

FIG. 3 is a schematic diagram of a current order generator in a system for controlling a motor of a hybrid vehicle according to an exemplary embodiment of the present invention.

As shown in FIG. 3, the current order generator 100 includes a revised temperature calculation module 102 and a current determination module 104.

The revised temperature calculation module 102 calculates a revised temperature in order to compensate a torque error according to counter electromotive force dispersion of the motor 50.

The resolver 60 includes a stator and a rotor, the stator of the resolver 60 is mounted on a stator of the motor 50 and the rotor of the resolver 60 is mounted on a rotor of the motor 50.

An error between the rotor position of the motor 50 and the rotor position of the resolver 60 may occur due to assemble tolerance, element deviation, or the like of the respective components.

For revising the error as described above, the revised temperature calculation module 102 may calculate a d-axis and q-axis voltage |VdqActLPF| of the motor 50 through 0 A current control to which applied during offset correcting the resolver 60.

In addition, the revised temperature calculation module 102 may calculate a counter electromotive force constant value λpm@T at a present temperature T of the motor 50 by using the d-axis and q-axis voltage |VdqActLPF| of the motor 50 and an electric angular speed WrLPF. The counter electromotive force constant value λpm@T is calculated by the following Equation 1.

$$\lambda pm@T = (|VdqActLPF|)/WrLPF \quad \text{[Equation 1]}$$

The revised temperature calculation module 102 may calculate a counter electromotive force constant value at an angle of 90 degree λpm@90 of the motor 50 by using the counter electromotive force constant value λpm@T at the present temperature T of the motor 50, a counter electromotive force temperature coefficient $\text{Coeff}_{LAMpm\_T}$, and a present temperature T of the motor 50. The counter electromotive force constant value at an angle of 90 degree λpm@90 is calculated by the following Equation 2.

$$\lambda pm@90 = \lambda pm@T/1 + 90 - T^*\text{Coeff}_{LAMpm\_T} \quad \text{[Equation 2]}$$

The revised temperature calculation module 102 may calculate a revised temperature ΔT by using the counter electromotive force constant value at an angle of 90 degree λpm@90 of the motor 50, a counter electromotive force design value at an angle of 90 degree λpm@90 MAP of the motor 50, and a counter electromotive force temperature coefficient $\text{Coeff}_{LAMpm\_T}$. The revised temperature ΔT is calculated by the following Equation 3.

$$\Delta T = (\lambda pm@90 \text{ MAP} - \lambda pm@90)/(\lambda pm@90 \text{ MAP}^*\text{Coeff}_{LAMpm\_T}) \quad \text{[Equation 3]}$$

The revised temperature calculation module 102 may calculate a compensation temperature Tc by adding the present temperature T of the motor 50 to the revised temperature ΔT, and transmit the compensation temperature Tc to the current determination module 104.

The current determination module 104 determines the d-axis current $i_d^*$ and the q-axis current $i_q^*$ based on a demand torque at a present driving condition T*, a present speed of the motor 50 ω, a maximum counter magnetic flux of the motor 50, and the compensation temperature Tc. For these purpose, the current determination module 104 may include at least one current map for each temperature 106 which is learned by temperature.

The d-axis current $i_d^*$ and the q-axis current $i_q^*$ calculated by the current determination module 104 are delivered to the current controller 110. Therefore, the current determination module 104 compensates the torque error according to counter electromotive force dispersion of the motor 50 by using the compensation temperature Tc.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A system for controlling a motor of a hybrid electric vehicle, comprising:
    a current order generator determining currents of first and second axes according to a driving condition;
    a current controller generating voltages of the first and second axes by using the currents of the first and second axes determined by the current order generator and feedback currents of the first and second axes;
    a coordinate transformer converting the voltages of the first and second axes into 3-phase voltage, and converting 3-phase feedback current into the feedback currents of the first and second axes and transmitting the feedback currents of the first and second axes to the current controller;
    a signal generator receiving the 3-phase voltage from the coordinate transformer and generating 3-phase signal corresponding thereto;
    a PWM inverter generating 3-phase current based on the 3-phase signal, and transmitting the 3-phase current to the coordinate transformer as the 3-phase feedback current; and
    a motor driven by receiving the 3-phase current from the PWM inverter,
    wherein the current order generator comprises a revised temperature calculation module calculating a revised temperature in order to compensate a torque error according to counter electromotive force dispersion of the motor, and a current determination module determining the currents of the first and second axes by substituting the corrected temperature to a current map for each temperature and by using a demand torque at a present driving condition, a present speed of the motor, and a maximum counter magnetic flux of the motor, wherein the revised temperature is calculated based on a counter electromotive force constant value at an angle of 90 degree of the motor and a counter electromotive force design value at an angle of 90 degree of the motor, wherein a design value is based on a motor type, and wherein the counter electromotive force constant value at an angle of 90 degree of the motor is calculated based on a counter electromotive force constant value at a present temperature of the motor, a counter electromotive force temperature coefficient, and a present temperature of the motor.

2. The system of claim 1, wherein the counter electromotive force constant value at a present temperature of the motor is calculated based on a d-axis voltage of the motor, a q-axis voltage of the motor, and an electrical angular velocity.

3. A system for controlling a motor of a hybrid vehicle that determines a current of a first axis and a current of a second axis according to a driving condition, converts the currents of the first and second axes into a 3-phase AC current, and drives the motor by applying the 3-phase AC current to the motor, the system comprising:

a revised temperature calculation module calculating a revised temperature in order to compensate a torque error according to counter electromotive force dispersion of the motor; and a current determination module determining the currents of the first and second axes by substituting the corrected temperature to a current map for each temperature and by using a demand torque at a present driving condition, a present speed of the motor, and a maximum counter magnetic flux of the motor, wherein the revised temperature calculation module calculates the revised temperature in order to compensate a torque error according to counter electromotive force dispersion of the motor by calculating a counter electromotive force constant value at a present temperature of the motor based on a d-axis voltage of the motor, a q-axis voltage of the motor, and an electrical angular velocity, and by calculating a counter electromotive force constant value at an angle of 90 degree of the motor based on the counter electromotive force constant value at a present temperature of the motor, a counter electromotive force temperature coefficient, and a present temperature of the motor.

* * * * *